(No Model.) 2 Sheets—Sheet 1.
P. C. PATTERSON.
APPARATUS FOR MANUFACTURING TUBING.
No. 593,966. Patented Nov. 16, 1897.
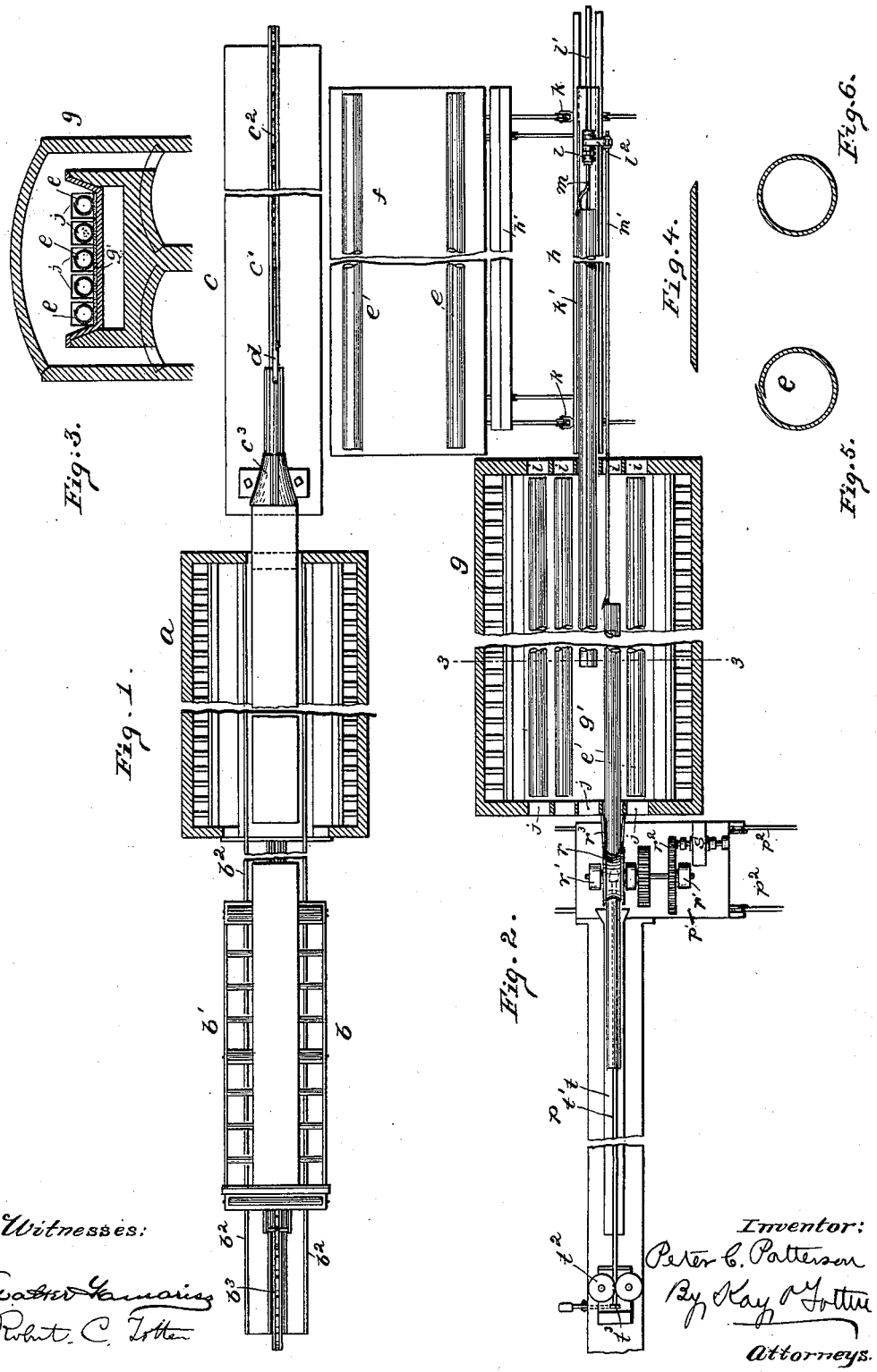

(No Model.) 2 Sheets—Sheet 2.
P. C. PATTERSON.
APPARATUS FOR MANUFACTURING TUBING.
No. 593,966. Patented Nov. 16, 1897.
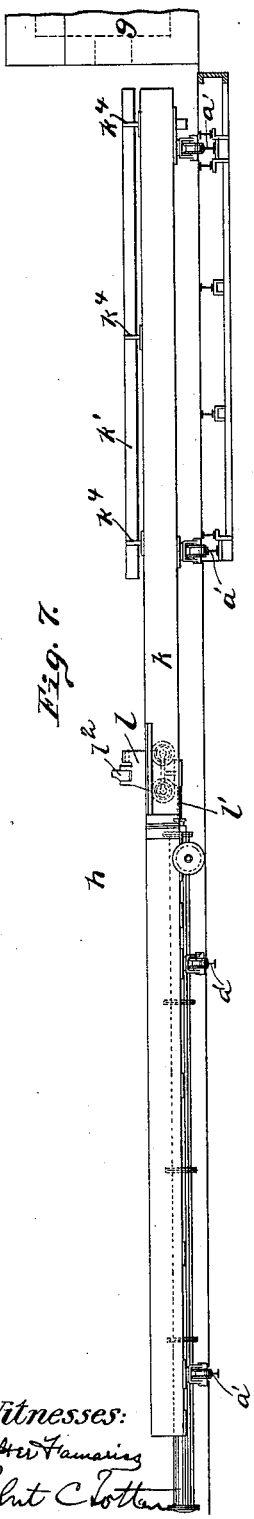
Fig. 7.
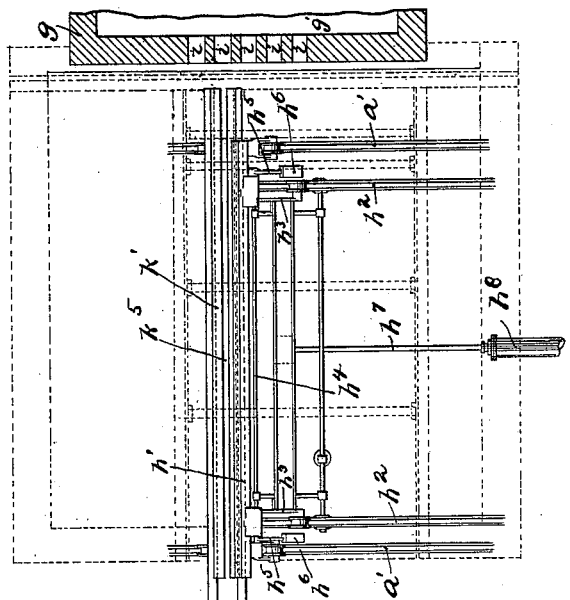
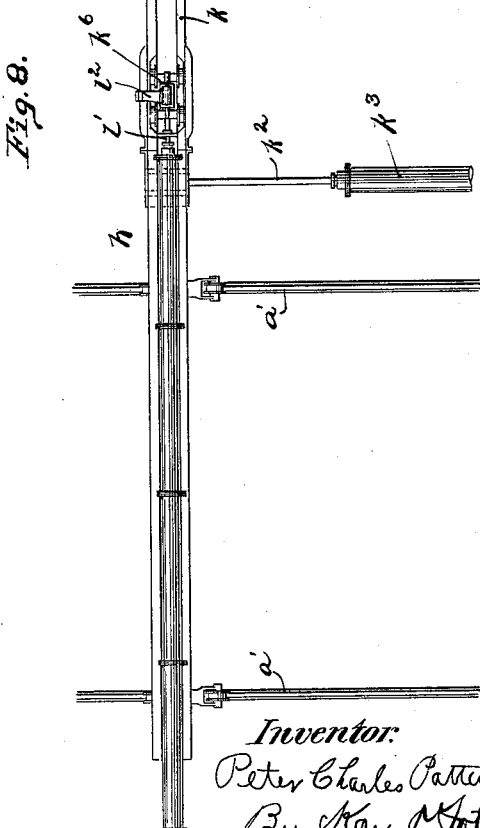
Fig. 8.
Witnesses: Inventor:
Peter Charles Patterson
By Kay & Totten
Attys
THE NORRIS PETERS CO., PHOTO-LITHO., WASHINGTON, D. C.

UNITED STATES PATENT OFFICE.

PETER CHARLES PATTERSON, OF McKEESPORT, PENNSYLVANIA.

APPARATUS FOR MANUFACTURING TUBING.

SPECIFICATION forming part of Letters Patent No. 593,966, dated November 16, 1897.

Application filed May 4, 1896. Serial No. 590,214. (No model.)

*To all whom it may concern:*

Be it known that I, PETER CHARLES PATTERSON, a resident of McKeesport, in the county of Allegheny and State of Pennsylvania, have invented a new and useful Improvement in Apparatus for the Manufacture of Tubing; and I do hereby declare the following to be a full, clear, and exact description thereof.

My invention relates to the manufacture of lap-weld tubing, one of its objects being to decrease the cost of manufacture by providing for the handling of the skelp in such a way that it is not permitted to cool materially between the time that the plate is heated for skelping and the time when it is formed into tubing, and, further, to protect the skelp from injury by the handling in the furnace, so that it is not bent or its scarfed edges injured or twisted out of shape by its movement in the welding-furnace, in this way providing for more rapid work and increased output from the same plant, more uniform quality of the pipe, and decrease in loss arising from the formation of stickers and imperfect pipe.

To these ends my invention comprises, generally stated, an apparatus for the manufacture of tubing in which are combined a skelping-furnace, a welding-furnace in proximity thereto, a receiving-platform in proximity to the two furnaces, and charging mechanism and tube-welding mechanism at the respective ends of the welding-furnace, both of which are movable transversely of the furnace, so as to feed the pipe through different charging-openings, and welding the pipe into tubing when pushed through different discharging-openings at the opposite end of the furnace into rolls which are brought into line with such openings, as described.

It also consists in certain other improvements, which will be hereinafter set forth and claimed.

To enable others skilled in the art to make and use my invention, I will describe the same more fully, referring to the accompanying drawings, in which—

Figure 1 is a plan view of a skelping-furnace with charging apparatus at one end and skelping mechanism at the other. Fig. 2 is a like view of the welding apparatus, the roofs of the furnace being removed in both cases. Fig. 3 is a cross-section of the welding-furnace, showing the skelp therein. Figs. 4, 5, and 6 are sections of the plate, skelp, and welded tube. Fig. 7 is a side view of the charging apparatus for the welding-furnace. Fig. 8 is a plan view of the same.

Like letters of reference indicate like parts in each view.

In the employment of my invention the skelping-furnace and the welding-furnace may be located in any suitable positions in proximity to each other, the drawings illustrating a convenient arrangement of the furnaces for that purpose. The skelping-furnace $a$ is illustrated as provided with gas and air ports, and in front of it is located a suitable charging-table $b$, while at the other or delivery end is located the skelping mechanism $c$. The skelping-furnace is adapted to receive the flat scarfed metal plates from which the tubing is to be formed, such as shown in Fig. 4, these plates being introduced into the furnace in any suitable way, the preferred mechanism for this purpose being illustrated in the drawings, in which a carriage $b'$, traveling on a suitable track $b^2$, is adapted to receive a pile of plates, which are then pushed into the furnace, part of the carriage entering therein and the drawings illustrating the means for moving the carriage as consisting of a traveling chain $b^3$. It is intended that the plates shall be placed upon the carriage, the ends of the plates projecting beyond the same, the furnace-door being open, the carriage pushed into the furnace, the plates traveling over the hearth in such operation, and then the carriage be withdrawn and the plates in this way be deposited on the hearth of the skelping-furnace. At the opposite end of the furnace is the skelping mechanism, which consists of the draw-bench $c'$, having a draw-chain $c^2$ mounted therein, and having a skelping-die $c^3$ at the forward end thereof.

To form the skelp from the plate, a pair of tongs $d$ is inserted through the skelping-die and grasps the plate within the furnace and is then connected to the drawing-chain and in that way draws the plate through the skelping-die, turning the flat plate up into circular form, with one scarfed edge projecting under the other, as shown in Fig. 5, so forming what is termed the "skelp"—that is, the plate bent to circular form ready for the welding operation. These skelps $e$ are then passed along a suitable table or platform, such as shown at $f$, to the charging apparatus of the welding-furnace. This charging apparatus is of the same construction as that which forms the subject-matter of an application filed by me of even date herewith, Serial No. 590,215. It is intended that the welding-furnace shall have a series of charging-doors corresponding to the number of skelps to be held within the furnace at one time—for example, the furnace being shown as arranged to receive five skelps and therefore having a corresponding number of charging-openings $i$ at one end and delivery-openings $j$ at the other end, the skelps resting on the hearth $g'$ of the furnace and the furnace being shown as heated by gas, having gas and air flues at each side.

The charging mechanism $h$ is made up of the following parts: Mounted on suitable tracks $h^2$ is the buggy $h^3$. A trough $h'$ is supported by the buggy $h^3$, said trough being mounted on the rocking shaft $h^4$. Suspended from the rocking shaft $h^4$ are the weighted arms $h^5$, carrying the weights $h^6$. The buggy $h^3$ is advanced and withdrawn by means of the rod $h^7$, connected thereto and working in the cylinder $h^8$. Mounted on suitable tracks $a'$ is the transversely-moving carriage $k$, which is connected to the piston-rod $k^2$, working in a cylinder $k^3$, whereby said carriage $k$ is moved on the tracks $a'$. A trough or platform $k'$ is supported on the carriage $k$, said trough resting upon the angle-bars $k^4$. A slot $k^5$ is formed the entire length of the trough $k'$, and below said slot are rails upon which the buggy $k^6$ travels. This buggy $k^6$ has the upwardly-extending pusher $l$, which extends up through the slot $k^5$ in the trough $k'$. This pusher is operated by suitable pushing-bar $l'$, which is moved by any suitable mechanism and which travels along the trough $k'$ and pushes the skelp out from the trough and delivers it into the furnace. This pusher $l$ is adapted to hold two pushing-forks, the one fork $m$ engaging with the skelp resting within the trough $k'$, while the arm $l^2$ of the pusher extends to one side of the trough and is adapted to receive a long pushing-bar $m'$, with a fork at its forward end which engages with the skelp within the furnace when it is brought to a welding heat and pushes it through one of the openings $j$ at the other end of the furnace and feeds it to the welding mechanism at the opposite end of the furnace. This welding mechanism $p$ is arranged to travel transversely of the furnace and to bring the welding-rolls into line with any one of the openings $j$, so as to receive and weld the pipe as it is received from the furnace. The special features of construction of this welding apparatus are fully described in an application filed by me of even date herewith, Serial No. 590,216, and it is only necessary to describe the same sufficiently to illustrate the present invention.

The whole apparatus is supported upon a carriage or transversely-traveling platform $p'$, which moves on tracks $p^2$ in front of the furnace, the welding-rolls $r$ being mounted in the housings $r'$ and driven by gearing, as at $r^2$, which is turned by suitable electric or other motor $s$, carried on the platform $p'$. In line with the rolls $r$ is the feeding-guide $r^3$, which is slightly flaring at its forward end or mouth and corresponds substantially in width to one of the delivery-openings $j$, while on the other side of the rolls is the trough $t$, and extending along the same is the mandrel $t'$, which acts to support the mandrel (shown in dotted lines) within the rolls, while back of the trough $t$ are the feeding-rolls $t^2$ for the mandrel-bar, which act to feed the same forward and back, and a suitable stop $t^3$ to hold the mandrel in position during the welding operation.

When the apparatus above described is employed for practicing the invention, the plates, of suitable width, which have been previously scarfed at the edges, are brought to the machine and are fed into the skelping-furnace, such as by the charging mechanism $b$, above described. In this furnace they are brought to a sufficient red heat to provide for skelping of the same, and when at that heat the tongs $d$ are passed through the skelping-die $c^3$ and grasp the plate and by means of the traveling chain $c^2$ draw the plate through the skelping-die, producing the skelps $e$, with their scarfed edges lapped, as above referred to. These skelps are so produced, and while still at a red heat are fed over the table or platform $f$ to the charging mechanism of the welding-furnace and are received by the carriage $h'$ and delivered into the trough $k'$, and when so delivered are engaged by the charging-fork $m$ and fed into the welding-furnace $g$. It is the intention to maintain within that furnace a suitable number of skelps. For example, the furnace shown is arranged to receive five skelps, and when one such skelp raised to the welding heat has been fed to the welding-rolls as the next such skelp is fed to the welding-rolls a fresh skelp is fed into the position occupied by the skelp which has just been welded into pipe, this being the most economical way to operate. It will be seen that on account of the proximity of the two furnaces the skelps are charged into the welding-furnace very shortly after being bent into skelp form and while practically at the same heat at which they were bent into skelp form, so that the heating of the plates in the skelping-furnace serves as a partial heating for the subsequent welding operation. It will also be noticed that the skelps are fed into the welding-furnace with their scarfed or lapped edges uppermost and that they are maintained in this position during the time they remain in the furnace, not being in any way disturbed, such as is the custom in the ordinary lap-weld furnaces, where the skelps are first fed in at a side opening and then rolled into the center of the furnace into line with the welding-rolls. In the present case, however, the skelps remain in the exact position in which they are fed until they are pushed into the rolls and their scarfed or lapped edges are maintained in the highest position, which is more directly in the zone of highest heat. For the formation of tubing, though it is necessary that the whole skelp be at a high heat, it is most important that the lapped portions thereof be at a welding heat, and in this way I am enabled to maintain the portions which are to be welded in the zone of highest heat, and therefore provide for their more rapid and even heating. Another very great advantage in the practical making of the tubing is in the fact that the skelps are not turned over during the time they are being raised to the welding heat, which is the ordinary custom and which often leads to the bending or twisting of the skelp out of shape or injury to the scarfed edges thereof, as it is in a very flexible and weak condition, on account of the high heat to which it is raised, and such twisting or injury often leads to the formation of stickers and imperfectly-welded tubing. When the skelp is at the proper heat, the pushing-fork $m'$ is connected thereto and the skelp is pushed out of the furnace and fed along the guideway $r^3$ to the welding-rolls $r$ and is thus welded into tubing; and it is to be further noticed that as the skelp has been charged into the furnace with its lapped edges upward it is sure to be in proper position for feeding to the welding-rolls, because it has not been disturbed while in the furnace, and the edges are in this way pressed together between the welding ball or mandrel and the top welding-roll. In the regular operation of the furnace the custom is then to receive a heated skelp from the platform $f$ into the carrier $h'$ and deliver it into the trough $k'$, and to move the welding mechanism $p$ into line with the opening through which the next skelp is to be fed and to push the skelp into the welding-furnace, it being preferred as this skelp is being fed from the furnace to push the skelp so received into the trough into position within the furnace while pushing the other skelp into the welding-rolls. In this way the operation of forming lap-weld tubing can be practiced very rapidly, because it requires but little time for the heated skelp to be raised to the welding heat within the welding-furnace, as they are fed thereto at a high heat, and, further, because there is no necessity for the handling of the skelp within the furnace, and it is maintained therein in such position that its lapped edges are exposed to the highest heat and are more rapidly brought together to a welding heat, and therefore the skelp is sooner in condition to be fed to the welding-rolls and a more perfect welding of the lapped edges obtained, while all the difficulties arising from the moving or rolling over of the skelp within the welding-furnace are done away with and the skelps are always maintained with their edges uppermost in proper position to be fed to the welding-rolls. The output from the furnace can therefore be very largely increased over the ordinary way of forming lap-weld tubing.

While the apparatus has special points of advantage when operated in the way above described, it is evident that it can also be employed to advantage where the skelp is turned or rolled over within the furnace-chamber, because even in such case a larger number of pipe can be maintained within the furnace-chamber and more rapid heating of the pipe accomplished, it being practicable to double the output of the furnace as compared with the ordinary way of working by the employment of the transversely-moving charging mechanism in combination with the transversely-moving welding mechanism, and that the invention can also be employed in forming butt-weld tubing which has been previously bent into skelp form. These are intended to be included within the scope of the invention.

What I claim as my invention, and desire to secure by Letters Patent, is—

1. The combination of a skelping-furnace and a welding-furnace in proximity with each other, a receiving-platform near the skelping-furnace, charging mechanism in line with that platform and movable transversely as to the welding-furnace and having a pusher movable longitudinally toward and from the welding-furnace, and welding mechanism at the opposite end of the welding-furnace movable transversely of the furnace, substantially as set forth.

2. The combination of a welding-furnace, charging mechanism at one end thereof, movable transversely thereof having a pusher movable longitudinally toward and from the furnace, and welding mechanism at the other end of the furnace movable transversely of the furnace adapted to bring the welding-rolls into line with two or more skelps within the furnace, substantially as set forth.

In testimony whereof I, the said PETER CHARLES PATTERSON, have hereunto set my hand.

PETER CHARLES PATTERSON.

Witnesses:
ROBERT C. TOTTEN,
WALTER FAMARISS.